DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 16, 1970

875 O.G. 361

T875,017

RECOVERY OF TOLYLENE DIISOCYANATE IN RISING FILM EVAPORATORS

Francis V. Bailor, Jr., 43 Henderson Road, Apt. 8D, Newark, Del. 19711, and John L. Littlefield, 103 Wentworth Drive, Claymont, Del. 19703

Filed Oct. 30, 1969, Ser. No. 872,587

**Int. Cl. B01d *3/04***

U.S. Cl. 203—73

1 Sheet Drawing. 12 Pages Specification

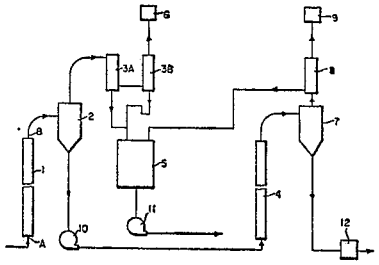

A process for the recovery of tolylene diisocyanate (TDI) from the crude reaction mass produced by the phosgenation of tolylene diamine which consists essentially of (1) distilling said crude reaction mass to produce TDI vapor and a viscous tarry distillation heel containing 50–80% TDI and 20–50% non-volatile residue, (2) passing said distillation heel through a heated tube about 4–20 feet in length and having an exit pressure of 0.5–15 mm. Hg to produce additional TDI vapor and a liquid effluent and (3) condensing and recovering said TDI vapor from steps (1) and (2).

June 16, 1970 F. V. BAILOR, JR., ETAL T875,017
RECOVERY OF TOLYLENE DIISOCYANATE IN RISING FILM EVAPORATORS
Filed Oct. 30, 1969
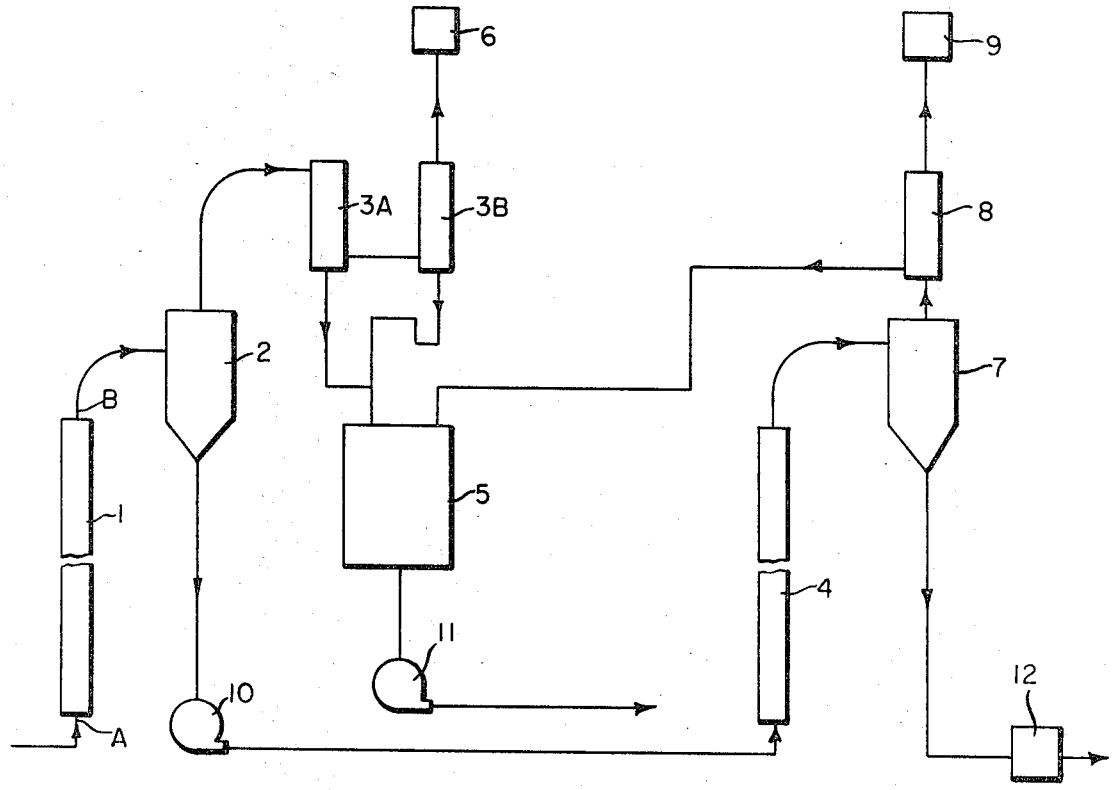
INVENTORS
FRANCIS V. BAILOR, JR.
JOHN L. LITTLEFIELD
BY
ATTORNEY